(No Model.)

R. C. BARBOUR.
AIR PUMP.

No. 526,175. Patented Sept. 18, 1894.

Witnesses
J. H. Sh—
Lillian D. Kelsey

Robert C. Barbour
Inventor
By attys
Earle Seymour

UNITED STATES PATENT OFFICE.

ROBERT C. BARBOUR, OF WATERBURY, CONNECTICUT, ASSIGNOR TO THE SCOVILL MANUFACTURING COMPANY, OF SAME PLACE.

AIR-PUMP.

SPECIFICATION forming part of Letters Patent No. 526,175, dated September 18, 1894.

Application filed October 28, 1893. Serial No. 489,427. (No model.)

*To all whom it may concern:*

Be it known that I, ROBERT C. BARBOUR, of Waterbury, in the county of New Haven and State of Connecticut, have invented a new Improvement in Air-Pumps; and I do hereby declare the following, when taken in connection with the accompanying drawings and the letters of reference marked thereon, to be a full, clear, and exact description of the same, and which said drawings constitute part of this specification, and represent, in—

Figure 1:
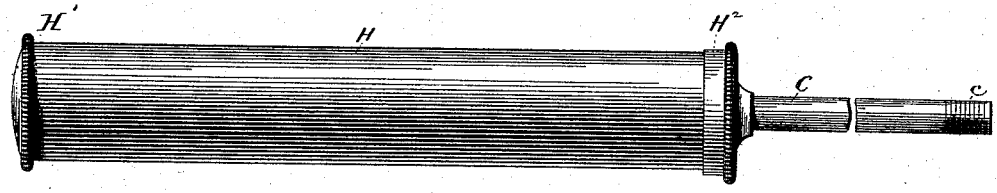
Figure 2:
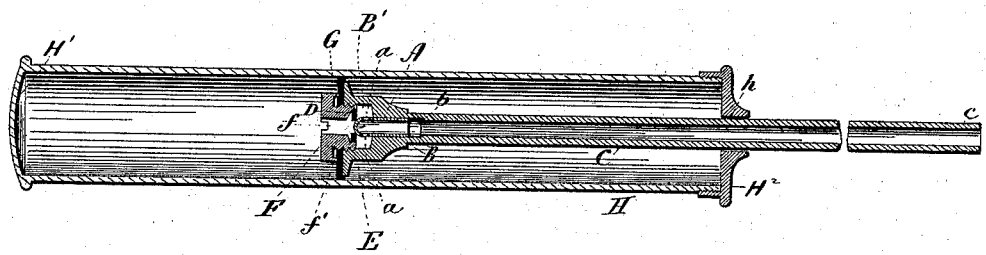
Figure 3:
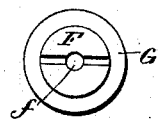

Figure 1, a view in side elevation of an air-pump constructed in accordance with my invention; Fig. 2, a view thereof in longitudinal central section; Fig. 3, a view in elevation of the piston.

My invention relates to an improvement in air-pumps, particularly designed for inflating the tires of pneumatic cycles, though adapted for other kindred uses, the object being to produce a simple, durable, and effective device.

With these ends in view, my invention consists in an air-pump having its piston furnished with a reciprocating tubular valve, of peculiar construction, and in certain details of construction and combination of parts as will be hereinafter described, and pointed out in the claim.

In carrying out my invention, as herein shown, I locate a tubular sheet-metal valve A, having its outer end rounded, and furnished with two small perforations $a\ a$, in the piston B, fixed to the inner end of the hollow piston-rod C, the inner end of the said valve seating on a shoulder $b$, formed within the said rod into which the said valve opens, and its rounded outer end coacting with a centrally open leather valve-seat D, located in a recess E, formed in the inner end of the shank of the screw F, which has a central opening $f$, leading through it, and through the valve-seat into the chamber B' formed in the outer end of the piston B. The said parts are constructed and arranged so that the valve is permitted a longitudinal reciprocating movement, sufficient to permit its rounded outer end to be seated on the seat D, or to be moved away from the said seat sufficiently to permit a free inflow of air through the passage $f$ into the chamber B', and therefrom through the perforations $a$, into the interior of the valve, and into the piston-rod. The inner face of the head of the screw F, is furnished with an annular bead $f'$, which takes into the washer G, forming a packing for the piston, and prevents the same from creeping and getting out of place. The threads of the shank of the said screw take into suitable threads formed around the inner wall of the chamber B' of the piston. The said piston is located in an ordinary cylinder H, closed at its outer or handle end by a fixed cap H', and at its inner or discharge end by a removable screw-cap $H^2$, having a central opening $h$, through which the piston rod passes, and which is enough larger in diameter than the diameter of the same, to permit air to flow around the rod into the cylinder. The outer end of the rod is threaded, as at $c$, for its attachment to the pneumatic tire of a cycle, or to any other object which it may be desired to inflate.

The operation of my improved air-pump is as follows: Let it be supposed that the cylinder by which the pump is operated as by a handle, is drawn out so as to locate the piston in its inner or discharge end. Then when the cylinder is pushed inward, the compression of the air in its outer or handle end will be transmitted to the valve A, through the passage $f$, in the screw, and force the valve inward into the head and away from its seat, so that the compressed air will flow from the outer end of the cylinder through the passage $f$ of the screw, thence into the chamber B' in the piston, thence through the perforations $a\ a$ in the valve, and from the valve into the piston-rod C, and from the same into the tire or other object being inflated. Now when the cylinder is moved outward, or the pressure in it is reduced below the pressure of the air in the tire, the pressure of the compressed air in the tire will act through the piston-rod to push the valve outward onto its seat, and thus prevent any air escaping back into the cylinder. These operations are repeated so long as the pump is operated, the valve being forced inward to permit the air compressed in the cylinder to flow into the piston-rod, and the air in the object being inflated acting upon the valve to close it and prevent any of the compressed air from escaping. It will thus be seen by the simple automatic action of the valve in the piston, I control the air compressed by the pump.

It will be understood that the pump is supplied with air for compression through the central opening $h$ formed in the removable screw-cap $H^2$, and around the hollow piston-rod C, which, as before described, is made enough smaller in diameter than the said opening to permit the air to flow into the cylinder. Then when the cylinder is drawn outward with respect to the piston, the washer G is drawn back so as to permit the air to pass between its edge and the inner wall of the cylinder, and thus occupy the space between the outer or handle end of the cylinder and the corresponding face of the washer. When, however, the cylinder is pushed inward, the edge of the washer is supported by the piston-head and not allowed to bend over to permit the air to pass to its other face. By reference to Fig. 3 of the drawings it will be seen that the piston head is larger in diameter, where it supports the washer, than the screw F, whereby the washer is prevented from bending in one direction, although permitted to do so in the other, as above described.

I would have it understood that I do not limit myself to the exact construction herein shown and described, but hold myself at liberty to make such changes and alterations therein as fairly fall within the spirit and scope of my invention.

I am aware, however, that a pump having a hollow piston-rod, a piston-head containing a valve, and a cylinder adapted to be taken hold of by the hand and played back and forth on the rod, is old, and I do not claim any such construction broadly. I am also aware that a tubular valve having perforations in its closed end is old, and I do not claim such construction broadly.

Having fully described my invention, what I claim as new, and desire to secure by Letters Patent, is—

In an air-pump, the combination with a cylinder having its outer or handle-end closed, and its inner or discharge-end furnished with a removable screw-cap having a central opening, of a tubular piston-rod entering the cylinder through the opening in the removable cap, a piston located at the inner end of the said rod, and containing a threaded chamber, a centrally perforated screw having its shank entered into the said chamber, a valve-seat mounted in the shank of the screw in line with the central perforation thereof, a washer or packing interposed between the head of the screw and the end of the piston, and a sheet-metal, tubular reciprocating valve located in the piston, having its outer end rounded, and adapted to coact with the valve-seat mounted in the shank of the screw, and formed with perforations which open into the chamber of the piston, and its inner end opening into the bore of the tubular piston-rod, and coacting with a shoulder formed in the said rod, to limit its reciprocating movement in one direction, substantially as set forth.

In testimony whereof I have signed this specification in the presence of two subscribing witnesses.

ROBERT C. BARBOUR.

Witnesses:
M. L. SPERRY,
GEO. F. HODGES.